(12) United States Patent
Imono et al.

(10) Patent No.: US 6,899,949 B2
(45) Date of Patent: May 31, 2005

(54) PROTECTIVE TAPE USED FOR OPTICAL MEMBER, TREATED LAYER FORMING AGENT USED FOR PROTECTIVE TAPE USED FOR OPTICAL MEMBER, OPTICAL FILM WITH PROTECTIVE TAPE AND IMAGE VIEWING DISPLAY WITH PROTECTIVE TAPE

(75) Inventors: Shozo Imono, Ibaraki (JP); Takuya Niino, Ibaraki (JP); Kazuhito Okumura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/408,858

(22) Filed: Apr. 7, 2003

(65) Prior Publication Data

US 2003/0219592 A1 Nov. 27, 2003

(30) Foreign Application Priority Data

Apr. 25, 2002 (JP) ........................................ 2002-123605
Jul. 23, 2002 (JP) ........................................ 2002-213304
Mar. 12, 2003 (JP) ........................................ 2003-065932

(51) Int. Cl.⁷ ................................................ B32B 9/00
(52) U.S. Cl. ..................... 428/354; 428/40.1; 428/41.5; 428/41.7; 428/41.9; 428/42.1
(58) Field of Search .............................. 428/40.1, 41.5, 428/41.7, 41.9, 42.1, 352, 354

(56) References Cited

U.S. PATENT DOCUMENTS 5,118,658 A * 6/1992 Egashira et al. ............ 503/227

2001/0009696 A1 7/2001 Kume et al.

FOREIGN PATENT DOCUMENTS

| JP | 57-207646 | 12/1982 |
|---|---|---|
| JP | 4-30120 | 2/1992 |
| JP | 9-87594 | 3/1997 |
| JP | 9-87595 | 3/1997 |
| JP | 9-113726 | 5/1997 |
| JP | 11-256115 | 9/1999 |
| JP | 11-256116 | 9/1999 |
| JP | 2000-98902 | 4/2000 |
| JP | 2000-212304 | 8/2000 |
| JP | 2001-202021 | 7/2001 |
| JP | 2002-91313 | 3/2002 |
| JP | 2002-264548 | 9/2002 |
| JP | 2002-268554 | 9/2002 |

* cited by examiner

*Primary Examiner*—Nasser Ahmad
(74) *Attorney, Agent, or Firm*—Knobbe, Martens, Olson & Bear, LLP

(57) ABSTRACT

A protective tape used for optical member comprising a plastic film base, an adhesive layer formed on one side of the plastic film base and a treated layer formed on an opposite side of the plastic film base, wherein the treated layer is formed with a treat agent comprising a release agent containing long chain alkyl group or silicone resin, and a cellulose polymer. The protective tape used for optical member is enabled to direct print with an ink on the treated layer and have a low adhesive property with the adhesive applied to an optical film.

12 Claims, 1 Drawing Sheet

# PROTECTIVE TAPE USED FOR OPTICAL MEMBER, TREATED LAYER FORMING AGENT USED FOR PROTECTIVE TAPE USED FOR OPTICAL MEMBER, OPTICAL FILM WITH PROTECTIVE TAPE AND IMAGE VIEWING DISPLAY WITH PROTECTIVE TAPE

BACKGROUND OF THE INVENTION

1. Field of the Invention

The present invention relates to a protective tape used for optical member. Furthermore, it relates to a treated layer forming agent used for protective tape used for optical member. The protective tape used for optical member of the invention is used for protection of a surface of various optical films, such as polarizing plates and retardation plates. The protective tape is used for protection of liquid crystal displays to attach on a surface of a liquid crystal display panel, and is used for protection of various kinds of image viewing displays, such as organic electroluminescence displays, PDPs, and etc.

2. Prior Art

Protective tape used for optical member has plastic film bases, such as polyethylene terephthalate and polyethylene, and have adhesive layers applied to the base. The protective tape used for optical member is attached on materials to be protected via an adhesive layer, and protects the materials to be protected from blemish, contamination, etc. For example, as optical materials to be protected, optical films, such as polarizing plates and retardation plates, may be mentioned (Japanese Patent Publication No. Hei 4-30120).

The above-mentioned protective tape protects one side of the optical film during various manufacturing processes. On the other hand, adhesive layer, such as acrylic based adhesive, is formed onto an opposite side of the optical film. Furthermore, the adhesive layer is covered with a release liner. Subsequently, the optical film with the protective tape is cut and processed according to a size of a liquid crystal cell. In addition, printing in ink is given to a backside (opposite side of the adhesive layer of the protective tape) of a base of the above-mentioned protective tape in order to enable distinction for various intended uses. And the optical film with protective tape is piled up, and stored.

Then, after various production processes or inspection, a release liner of the optical film with the protective tape is released, and, subsequently the optical film is attached to a liquid crystal cell. Then, the above-mentioned protective tape is released and is removed in a stage where protection of a surface for an optical film is not required, for example, a state immediately before a liquid crystal panel is built into a personal computer.

As a method of releasing a protective tape, a method may be often adopted in which a commercially available cellophane adhesive tape is attached on a corner of a protective tape, then the tape is vertically pulled up, and thereby the surface protective tape is released together with the tape (Japanese Patent Publication No.hei 9-113726). This is because that this method has a large effect of preventing damage or releasing in a corner of an optical film in comparison with a method of directly releasing protective tape by hand.

In the optical film with the above-mentioned protective tape, when they are piled up after cutting processing, there is a possibility that adhesives over flown from a cut surface may adhere to the surrounding protective tapes. Therefore, a treated layer (antifouling layer) comprising releasing agent etc. is formed on a backside of the protective tape base so that blocking of the optical film with the protective tape may not given. And as treat agent, a polymer containing long chain alkyl group, silicone type or fluoride type release agent is proposed (for example, Japanese Patent Publication No.hei 11-256115, Japanese Patent Publication No.hei 11-256116).

However, a treated layer formed on the backside makes difficult direct printing onto the treated layer by ink for discrimination of intended uses, using treat agent indicated by the above-mentioned Referential Patents. In conventional methods, by such reason, a portion to be printed in the treated layer was once wiped off with solvents, such as toluene, to make the portion clean, and then printing was given to an exposure plastics surface. On the other hand, if the treated layer is designed so that a direct printing to the treated layer may be enabled, inevitably, the treated layer concerned will have good adhesive property with adhesives over flown from a cut surface, as a result, leading to occurrence of blocking.

SUMMARY OF THE INVENTION

The invention aims at providing a protective tape used for optical member having an adhesive layer formed on one side of a plastic film base and having a treated layer formed on an opposite side of the plastic film base that is enabled to direct print with an ink on the treated layer and have a low adhesive property with the adhesive applied to an optical film.

And the invention also aims at providing a treated layer forming agent used for the above-mentioned protective tape used for optical member. Furthermore, the invention aims at providing an optical film with the protective tape used for optical member to which the above-mentioned protective tape used for optical member is attached, and an image viewing display with the protective tape used for optical member.

As a result of wholehearted research in order to attain the above-mentioned purpose performed by the present inventors, it was found out that the above-mentioned subject might be attained by an protective tape used for optical member shown below, leading to completion of the invention. That is, in the invention, there are provided:

1. A protective tape used for optical member comprising a plastic film base, an adhesive layer formed on one side of the plastic film base and a treated layer formed on an opposite side of the plastic film base, wherein the treated layer is formed with a treat agent comprising a release agent containing long chain alkyl group and a cellulose polymer;

2. The protective tape used for optical member according to above-mentioned 1, wherein the plastic film is a polyester film;

3. The protective tape used for optical member according to above-mentioned 1, wherein the release agent containing long chain alkyl group is acrylic polymer containing alkyl group with carbon numbers of 8 or more, and comprise acrylonitrile as copolymerization components;

4. A treated layer forming agent used for protective tape used for optical member comprising a release agent containing long chain alkyl group and a cellulose polymer;

5. A protective tape used for optical member comprising a plastic film base, an adhesive layer formed on one side of the plastic film base and a treated layer formed on an opposite side of the plastic film base, wherein the treated layer is formed with a treat agent comprising a silicone resin and a cellulose polymer;

6. The protective tape used for optical member according to above-mentioned 5, wherein the plastic film is a polyester film;

7. A treated layer forming agent used for protective tape used for optical member comprising a silicone resin and a cellulose polymer;

8. A protective tape used for optical member comprising a plastic film base, an adhesive layer formed on one side of the plastic film base and a treated layer formed on an opposite side of the plastic film base, wherein the treated layer is formed with a treat agent comprising a release agent containing long chain alkyl group, a silicone resin and a cellulose polymer;

9. The protective tape used for optical member according to above-mentioned 8, wherein the plastic film is a polyester film;

10. The protective tape according to above-mentioned 8, wherein the release agent containing long chain alkyl group is acrylic polymer containing alkyl group with carbon numbers of 8 or more, and comprise acrylonitrile as copolymerization components;

11. A treated layer forming agent used for protective tape used for optical member comprising a release agent containing long chain alkyl group, a silicone resin and a cellulose polymer;

12. An optical film with an protective tape, wherein the protective tape used for optical member according to any one of above-mentioned 1 through 3, 5, 6, 8 through 10 attached on the optical film;

13. An image viewing display with a protective tape, wherein the protective tape used for optical member according to any one of above-mentioned 1 through 3, 5, 6, 8 through 10 attached on the image viewing display.

In the above-mentioned protective tape used for optical member, a cellulose based polymer is comprised together with a release agent containing long chain alkyl group in the treated layer. Moreover, in the above-mentioned protective tape used for optical member, a cellulose based polymer is comprised with a silicone resin in the treated layer. Furthermore, in the above-mentioned protective tape used for optical member, a cellulose based polymer is comprised with a release agent containing long chain alkyl group and a silicone resin in the treated layer. Existence of the cellulose based polymer enables improvement ink fixability of the treated layer, and enables printing which does not repel ink in process of stamping with stamping inks and printing by ink jet to the treated layer. Therefore, in the treated layer on a base backside, even without wiping and cleaning with solvents, direct printing with inks onto the treated layer surface is enabled. Therefore, colored ink realizing easy discrimination by the naked eyes as an identification method may be easily printed by a stamping and an ink jet method onto the treated layer according to various kinds of optical intended uses, such as optical films as polarizing plates and retardation plates, and liquid crystal display panels. Moreover, the above-mentioned treated layer maintains release property, shows a low adhesive property with acrylic based adhesives applied to optical films, thereby hardly causing a blocking problem even wthen piled up as an optical film with a protective tape.

Besides, the above-mentioned treated layer has a certain level of adhesive property with cellophane adhesive tape. Therefore, in a protective tape used for optical member of the invention, in following production processes, cellophane adhesive tape used may be easily released, and thus good performance is shown also in picking up property with cellophane adhesive tape from materials to be protected.

DESCRIPTION OF THE PREFERRED EMBODIMENTS

Figure 1:
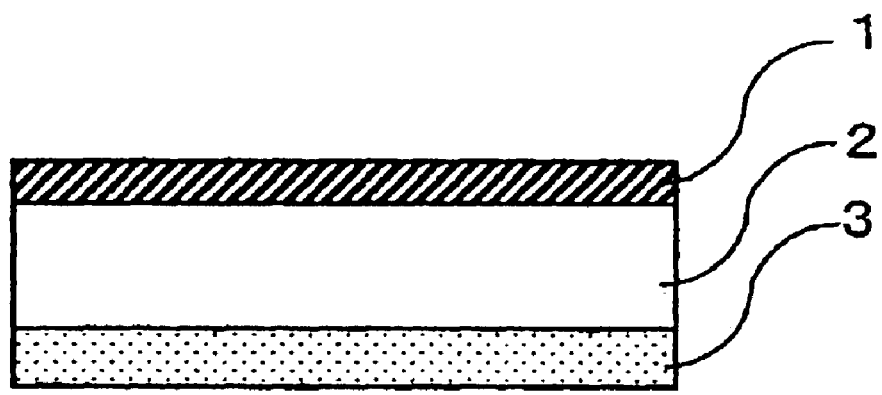
FIG. 1 shows a sectional view of a protective tape used for optical member of the invention.

Hereafter, description will be given about a protective tape used for optical member of the invention with reference to drawings. A protective tape used for optical member of the invention has an adhesive layer 3 on one side of a plastic film base 2, and has a treated layer 1 on an opposite side, as shown in FIG. 1. Moreover, a protective tape used for optical member of the invention may be used as a sheet-like material.

As plastic film base 2, bases conventionally used for protective tape used for optical members may be used without special limitation. As film materials, in general, in the light of easiness in inspection of optical films by fluoroscopy and management, for example, there may be mentioned transparent films, such as polyester based resins, cellulose based resins, acetate based resins, polyether sulfone based resins, polycarbonate based resins, polyamide based resins, polyimide based resins, polyolefin based resins, and acrylic based resins. Among them, polyester based resins are preferable. The film base may be used as laminated materials of one kind or two or more kinds of film materials, and moreover stretched materials of the above-mentioned films may also be used. In general, a thickness of the plastic film base 2 is 500 $\mu$m or less, and preferably in a range of 10 through 200 $\mu$m.

Although any adhesives, such as acrylic based, synthetic rubber based, rubber material based, and silicone based, may be used as adhesives for formation of the adhesive layer 3, acrylic based adhesives comprising acrylic based polymers as a base polymer are preferable in the light of, such as fluoroscopic property, weatherability, and heat resistance. A weight-average molecular weight of the acrylic based polymer, is preferably approximately 300,000 through 2,500,000.

Various alkyl (meth)acrylates may be used as monomers used for the acrylic based polymers. For example, there may be mentioned: alkyl (meth)acrylates (for example, alkyl esters with carbon numbers of 1 through 20, such as methyl ester, ethyl ester, propyl ester, butyl ester, 2-ethyl hexyl ester, isooctyl ester, isononyl ester, isodecyl ester, dodecyl ester, lauryl ester, tridecyl ester, pentadecyl ester, hexadecyl ester, heptadecyl ester, octadecyl ester, nonadecyl ester, and eicosyl ester), and they may be used independently or two or more of them may be used in combination.

In order to give polarity to acrylic based polymers obtained, monomers comprising carboxyl groups, such as (meth)acrylic acid and itaconic acid; monomers comprising hydroxyl groups, such as hydroxyethyl (meth)acrylate and hydroxypropyl (meth)acrylate; monomer comprising amide groups, such as N-methylol acrylamide; monomers comprising cyano groups, such as (meth)acrylonitrile; monomers comprising epoxy groups, such as glycidyl (meth) acrylate; vinyl esters, such as vinyl acetate; and styrene based monomers, such as styrene and α-methyl styrene etc. may be used as copolymer monomers with the above-mentioned alkyl (meth)acrylates.

Moreover, polymerization method of the acrylic based polymer is not especially limited, and well-known polymerization methods, such as a solution polymerization, an emulsion polymerization, a suspension polymerization, and a UV polymerization, may be adopted.

Cross-linking agent may be comprised in the above-mentioned adhesives. As cross-linking agents, polyisocyanate compounds, polyamine compounds, melamine resins, urea resins, epoxy resins, etc. may be mentioned. Furthermore, tackifiers, plasticizers, fillers, antioxidants, UV absorbents, silane coupling agents, etc. may also be used suitably, if needed, to the above-mentioned adhesives.

Formation method of the adhesive layer 3 is not especially limited, and there may be mentioned methods, such as: (a transfer method) in which an adhesive is applied onto a release liner, and an adhesive layer formed is transferred to the film base 2 after the adhesive layer is dried; and (a direct method) in which an adhesive is directly applied onto the film base 2, and then dried. A thickness (a film thickness in a dried state) of the adhesive layer 3 is determined according to an adhesive strength needed. The thickness is usually approximately 1 through 100 µm, and preferably 5 through 50 µm.

A treated layer 1 is formed of treat agent comprising a release agent containing long chain alkyl group and a cellulose based polymers. As the release agent containing long chain alkyl group, polymer, which have release property, having long chain alkyl groups with a carbon number of 8 or more is suitably used. When the carbon number is 7 or less, a shortcoming arises in respect of release property. As long chain alkyl groups with carbon number of 8 or more, octyl group, nonyl group, decyl group, undecyl group, dodecyl group, hexadecyl group, octadecyl group, eicosyl group, etc. may be mentioned, and usually the carbon number of the long chain alkyl group is approximately 8 through 50. In view of release property of the polymer, the carbon number concerned is preferably 12 through 40.

As polymers having release property, for example, copolymers (acrylic based polymers) of the above-mentioned alkyl acrylate and/or alkyl methacrylate having long chain alkyl groups, and polar group monomers, such as acrylic acid, methacrylic acid, and acrylonitrile, may be mentioned. A percentage of the above-mentioned polar group monomers is preferably 90 mol % or less among the copolymers (acrylic based polymers), and especially preferably is 50 through 80 mol %. In consideration of printing property, acrylonitrile is preferable as the above-mentioned polar group monomers. Other monomers may also be further copolymerized to these copolymers in a range not impairing the release property of the polymer.

As polymers having release property other than the above-mentioned examples, modified polymers may be used that are modified by polymers having active hydrogen groups and long chain alkyl compounds having at least one of functional group reactive with active hydrogen, such as isocyanate groups, carboxylic acid groups, acid halides, ketene groups, aldehyde groups, and epoxy groups and having alkyl groups with a carbon numbers of than 8 or more. As the above-mentioned polymers having active hydrogen's, partially saponified polyvinyl acetates, polyvinyl alcohols, ethylene vinyl alcohols, butyral resins, polyethylene imines, cellulose resins, methacrylic acid methyl ester acrylic acid copolymers, etc. may be mentioned. As long chain alkyl compounds having functional groups, octadecyl isocyanate, docosanylisocyanate, octadecanoic acid, docosanoic acid, octadecanoyl fluoride, docosanoylchloride, etc. may be mentioned.

In addition, a percentage of the above-mentioned long chain alkyl groups in the polymers having release property are not especially limited, as long as the polymer has release property, but it is preferable that the percentage of the long chain alkyl groups is approximately 50 through 90% by weight.

A weight-average molecular weight of the above-mentioned polymers having release property is preferably approximately 10,000 through 400,000, and more preferably 30,000 through 200,000. A weight-average molecular weight of 10,000 or less decreases formation property of a release film, and a weight-average molecular weight exceeding 400,000 deteriorate solubility of the polymer, and leads to problem occurrence in workability.

Treated layer 1 is formed with a treat agent comprising a silicone resin and a cellulose based polymers. As silicone resins, resins well-known as a tackifier of silicone based adhesives etc. may be used without special limitation. As silicone resins, there may be preferably used organo polysiloxanes comprising three-dimensional copolymers having monofunctional unit M represented by a general formula: $R_3SiO$— and having at least one kind unit selected from a group consisting of trifunctional unit T represented by a general formula: $RSi(O—)_3$; difunctional unit D represented by a general formula: $R_2Si(O—)_2$; and tetrafunctional unit Q represented by a general formula: $Si(O—)_4$ (where, R represents monovalent hydrocarbon group, alkenyl or hydroxyl group). As R in the above-mentioned general formula, for example, monovalent hydrocarbon groups, as aliphatic hydrocarbon groups, such as methyl group, ethyl group and propyl group, and aromatic hydrocarbon groups, such as phenyl groups, may be mentioned. Moreover, a part of R may have proper structural units, as organic groups, such as alkenyl groups, as vinyl groups and hexsenyl, and hydroxyl groups. As the above-mentioned copolymers, "MQ resin" having unit M and unit Q is preferable. Although one kind or a suitable combination of two kinds or more may be used as these silicone resins, it is most preferable that only MQ resin is used as silicone resins.

Moreover, silicone gums, such as dimethylsiloxanes, may also be suitably comprised in the silicone resins as a release regulator in a range that does not affect printing property. An amount of the silicone gum added is specifically 20% or less by weight of a sum total weight of the silicone resin and the silicone gum, and preferably 15% or less by weight. When the silicone gum is added, an amount is preferably approximately 1% or more by weight.

A treated layer 1 is formed of treat agent comprising a release agent containing long chain alkyl group, a silicone resin and a cellulose based polymers.

The cellulose polymer is used for the purpose of improvement in ink fixability as mentioned above. As cellulose polymer, cellulose derivatives, such as methylcellulose, ethylcellulose, and acetylcellulose may be mentioned.

Although an amount of the above-mentioned cellulose based polymers used is not especially limited, there may be shown a tendency that small amount of the above-mentioned cellulose based polymer deteriorate printing property on a surface of a treated layer. Besides, a large amount of cellulose based polymers used weakens a film strength of a treated layer, and simultaneously reduces adhesion with a base, as a result leading to occurrence of separation and falling off of the treated layer from the base by friction etc. And when the cellulose based polymer is blended with the release agent containing long chain alkyl group, a large amount of the cellulose based polymer used increases adhesive strength to acrylic based adhesives formed on an optical film, and, as a result, blocking by adhesives formed out of a cutting plane may easily occurs when the optical films are piled up after cutting processing. In the light of printing property, blocking property, and separation property etc., an amount of cellulose based polymer used is preferably in a level of 2 through 400 parts by weight to the release agent containing long chain alkyl group or the silicone resins 100 parts by weight, and more preferably 5 through 200 parts by weight.

When the release agent containing long chain alkyl group and the silicone resin are used in combination, an amount of cellulose based polymer used is preferably in a level of 2 through 400 parts by weight to a total amount of the release agent containing long chain alkyl group and the silicone resin 100 parts by weight, and more preferably 5 through 200 parts by weight.

The above-mentioned treat agent is diluted with solvents, such as toluene, ethyl acetate, and methyl ethyl ketone, and, subsequently is applied to a plastic film base 2, using a smoothing bar, a photogravure coater, an offset coater, etc. A coated amount after dried of the treated layer 1 formed on the plastic film base is usually 0.003 through 2 $g/m^2$, and preferably 0.005 through 1 $g/m^2$.

A method for manufacturing a protective tape used for optical member of the invention is not especially limited, but well-known means may be suitably adopted. For example, a method may be mentioned where treat agent is applied onto one surface of a plastic film base 2, then dried in a heated oven to form a treated layer 1, and subsequently an adhesive layer 3 is formed on an opposite surface of the plastic film base 2 using the above-mentioned means, and finally rolled up on a core.

EXAMPLE

Although still more detailed description will be given to below for a protective tape used for optical member of the invention with reference to Examples, the invention is not limited to them.

Example 1
(Preparation of a Treat Agent)

As a release agent containing long chain alkyl group, a toluene solution of a copolymer of octadecyl methacrylate and acrylonitrile (molar ratio: octadecyl methacrylate/acrylonitrile=30/70, weight-average molecular weight 70,000) was used. The release agent containing long chain alkyl group solution, and a toluene solution of ethylcellulose (manufactured by HERCULES CO., LTD., 48.0 through 49.5% of rate of ethoxylizing of hydroxyl group) was mixed, and a 0.5% by weight of treat agent (toluene solution) was prepared. Ethylcellulose was set as 10 parts by weight expressed in terms of solid to the release agent containing long chain alkyl group 100 parts by weight in the treat agent.
(Preparation of an Adhesive Used for a Protective Tape Used for Optical Member)

Trimethylolpropane tolylene diisocyanate 3 parts by weight expressed in terms of solid was added to a 25% ethyl acetate solution of an acrylic based polymer comprising 2-ethyl hexyl acrylate, methylmethacrylate, and 2-hydroxyethyl acrylate (weight ratio: 68/29/3, weight-average molecular weight 400,000) at a ratio to the above-mentioned acrylic based polymer 100 parts by weight, and mixed to prepare an acrylic based adhesive composition.

(Preparation of a Protective Tape Used for Optical Member)

The above-mentioned treat agent was applied on one side of a polyethylene terephthalate film with a thickness of 38 $\mu m$ to give an applied amount after dried of 0.04 $g/m^2$, using a Mayer bar, and dried for 1 minute at 120° C. to form a treated layer. Subsequently, the above-mentioned acrylic based adhesive composition was applied onto an opposite side of the treated layer on the above-mentioned polyethylene terephthalate film to give a thickness after dried of 15 $\mu m$ using an applicator, and then dried for 2 minutes at 120° C. to form an adhesive layer, and thus an protective tape used for optical member was obtained.

Example 2

Except for having added 100 parts by weight of ethylcellulose in Example 1 (preparation of a treat agent) to a release agent containing long chain alkyl group 100 parts by weight, same method as in Example 1 was repeated, and a treat agent was prepared. And a protective tape used for optical member was obtained as in Example 1.

Example 3

Except for having added 300 parts by weight of ethylcellulose in Example 1 (preparation of a treat agent) to a release agent containing long chain alkyl group 100 parts by weight, same method as in Example 1 was repeated, and a treat agent was prepared. And a protective tape used for optical member was obtained as in Example 1.

Example 4
(Preparation of a Treat Agent)

As silicone resin (MQ resin), a toluene solution of a material with a trade name: X-40-2134 (manufactured by Shin-Etsu Chemical Co., Ltd.) was used. A toluene solution of ethylcellulose (manufactured by HERCULES CO., LTD., 48.0 through 49.5% of rate of ethoxylizing of hydroxyl group) was mixed with the silicone resin, and a 0.5% by weight of treat agent (toluene solution) was prepared. Ethylcellulose was set as 10 parts by weight expressed in terms of solid to the silicone resin 100 parts by weight in the treat agent.

Except for having used treat agent prepared above as a treat agent in Example 1 (preparation of a protective tape used for optical member), same method as Example 1 was repeated, and protective tape used for optical member was obtained.

Example 5

Except for having added 100 parts by weight of ethylcellulose to the silicone resin 100 parts by weight in Example 4 (preparation of a treat agent), same method as in Example 4 was repeated, and a treat agent was prepared. And a protective tape used for optical member was obtained as in Example 1.

Example 6

Except for having added 200 parts by weight of ethylcellulose to the silicone resin 100 parts by weight in Example 4 (preparation of a treat agent), same method as in Example 4 was repeated, and a treat agent was prepared. And a protective tape used for optical member was obtained as in Example 1.

Example 7

The toluene solution of the release agent containing long chain alkyl group according to Example 1, the toluene solution of the silicone resin and the toluene solution of ethylcellulose according to Example 4 were mixed, and a 0.5% by weight of treat agent (toluene solution) was prepared. Ethylcellulose was set as 100 parts by weight expressed in terms of solid to the release agent containing long chain alkyl group 100 parts by weight and the silicone resin 100 parts by weight in the treat agent. And a protective tape used for optical member was obtained as in Example 1.

Comparative Example 1

Except for having used only the release agent containing long chain alkyl group according to Example 1 as a treat agent in Example 1 (preparation of an protective tape used for optical member), same method as Example 1 was repeated, and a protective tape used for optical member was obtained.

Comparative Example 2

In Example 1 (preparation of an protective tape used for optical member), except for having used only the silicone resin according to Example 4 as a treat agent, same method as in Example 1 was repeated, and a protective tape used for optical member was obtained.

Comparative Example 3

In Example 1 (preparation of a protective tape used for optical member), except for not having performed formation of a treated layer, same method as in Example 1 was repeated, and a protective tape used for optical member was obtained.

The protective tape used for optical members obtained in Examples and Comparative examples were evaluated for following characteristics. All measurements were carried out under ambient atmosphere of 23° C. and 65% RH. Table 1 shows results.

(Evaluation Item and Evaluation Method)
(1) Printing Property of a Treated Layer Printing was performed to a treated layer of a protective tape used for optical member using commercially available oily ink stamp [a product manufactured by Shachihata Inc., quick-drying X stamper: red, and blue], and Ink jet [a product manufactured by Video Jet Technologies Japan Inc. EXCEL series 170i, ink: red (16-8460), and blue (16-7900)]. Evaluation was given using five-point method, as following criteria.

Point 5—Excellent, no ink repellence
Point 1—Poor, much ink repellence observed (2) Adhesive Strength to an Acrylic Based Adhesive of a Treated Layer 1) Trimethylolpropane tolylene diisocyanate 1.5 parts by weight was added to a 30% ethyl acetate solution of an acrylic based polymer of butyl acrylate/acrylic acid (weight ratio: 100/3, weight-average molecular weight 300,000) to the above-mentioned acrylic based polymer 100 parts by weight expressed in terms of solid, and mixed to prepare an acrylic based adhesive composition.

2) The above-mentioned acrylic based adhesive composition was applied on a polyethylene terephthalate film with a thickness of 75 μm so as to give a thickness after dried of 40 μm, dried for 3 minutes at 130° C. to form an adhesive layer. A release liner was attached on this adhesive material layer, and a test sample for adhesive power measurement of the treated layer (adhesive sheet) was prepared.

3) A side opposite to the acrylic adhesive side of the above-mentioned sample (polyethylene terephthalate film side) was attached onto a SUS board using double-stick tape No.500 by NITTO DENKO CORP.

4) A polyethylene terephthalate film with a thickness of 25 μm was attached to the adhesive layer of the protective tape used for optical member (50 mm width) (so as not to disturb adhesive power measurement of the treated layer to the acrylic based adhesive), and a treated layer of the protective tape used for optical member was attached on a side of the acrylic adhesive of the sample made in 3).

5) The sample was kept to stand for 30 minutes after attached, and subsequently, the protective tape used for optical member was 180-degree peeled at a rate of 0.3 m/minute to obtain an adhesive power of the treated layer.

(3) Pick Up Property of Protective Tape Used for Optical Member by Cellophane Adhesive Tape A protective tape used for optical member was attached on a polarizing plate, and left it alone for 24 hours. Subsequently, immediately after a cellophane adhesive tape No. 29 by NITTO DENKO CORP. was attached on a treated layer of an protective tape used for optical member on a corner of the polarizing plate, the cellophane adhesive tape was vertically drawn up, and it was evaluated whether the protective tape used for optical member was released from the polarizing plate, by following criteria.

O—Protective tape used for optical member released
x—Protective tape used for optical member not released (4) Falling Off of a Treated Layer A protective tape used for optical member was fixed on a glass plate so that an adhesive layer faced downward. Subsequently, the treated layer was rubbed back and forth 5 times by an index finger, and falling off of the treated layer after the rubbing was evaluated according to following criteria.

TABLE 1

| | Printing property | | Adhesive power of a treated layer (N/50 mm) | Pick up property | Falling off Property |
|---|---|---|---|---|---|
| | Stamping | Ink jet | | | |
| Example 1 | 5 | 5 | 1.2 | O | O |
| Example 2 | 5 | 5 | 2.0 | O | O |
| Example 3 | 5 | 5 | 9.5 | O | O |
| Example 4 | 5 | 5 | 8.1 | O | O |
| Example 5 | 5 | 5 | 7.5 | O | O |
| Example 6 | 5 | 5 | 6.9 | O | O |
| Example 7 | 5 | 5 | 4.1 | O | O |
| Comparative example 1 | 1 | 3 | 1.5 | O | O |
| Comparative example 2 | 1 | 3 | 20.0 | O | O |
| Comparative example 3 | 5 | 5 | 30.0 | O | — |

O almost no falling off of treated layer
A a little falling off of treated layer
X remarkable falling off of treated layer are.

What is claimed is:

1. A protective tape used for optical member comprising a plastic film base, an adhesive layer formed on one side of the plastic film base, and a treated layer formed on an opposite side of the plastic film base,
   wherein the treated layer is formed with a treat agent comprising a blend of a release agent containing long chain alkyl group and a cellulose polymer, said release agent comprising acrylonitrile as copolymerization components.

2. The protective tape used for optical member according to claim 1, wherein the plastic film is a polyester film.

3. The protective tape used for optical member according to claim 1, wherein the release agent containing long chain alkyl group is an acrylic polymer containing alkyl group with carbon numbers of 8 or more.

4. The protective tape according to claim 1, wherein the treated layer further comprises a silicone resin.

5. The protective tape according to claim 1, wherein the release agent is an acrylic polymer of 50–80 mol % of acrylonitrile and the remaining percentage of alkyl acrylate and/or alkyl methacrylate having long chain alkyl groups.

6. The protective tape according to claim 1, wherein a ratio of the cellulose polymer to the release agent is 2/100 to 200/100 by weight.

7. A protective tape used for optical member comprising a plastic film base, an adhesive layer formed on one side of the plastic film base, and a treated layer formed on an opposite side of the plastic film base,
wherein the treated layer is substantially made of a blend of a release agent containing long chain alkyl group and a cellulose polymer, said release agent being an acrylic polymer of polar group monomers and alkyl acrylate and/or alkyl methacrylate having long chain alkyl groups.

8. The protective tape according to claim 7, wherein a ratio of the cellulose polymer to the release agent is 2/100 to 200/100 by weight.

9. The protective tape according to claim 7, wherein the polar group monomers account for 50–80 mol % of copolymerization components.

10. The protective tape according to claim 7, wherein the polar group monomers are selected from the group consisting of acrylonitrile, acrylic acid, and methacrylic acid.

11. An optical film with a protective tape, wherein the protective tape used for optical member according to any one of claims 1 through 3, 4, and 5 through 10 attached on the optical film.

12. An image viewing display with a protective tape, wherein the protective tape used for optical member according to any one of claims 1 through 3, 4, and 5 through 10 attached on the image viewing display.

* * * * *